US006174655B1

(12) United States Patent
Shirokura et al.

(10) Patent No.: US 6,174,655 B1
(45) Date of Patent: Jan. 16, 2001

(54) BIAXIAL ORIENTED POLYESTER FILM AND METHOD OF MANUFACTURING SAME, PHOTOGRAPHIC SUBSTRATE, AND PHOTOGRAPHIC LIGHT-SENSITIVE MATERIAL

(75) Inventors: Yukio Shirokura; Fumiyuki Suzuki, both of Shizuoka-ken (JP)

(73) Assignee: Fuji Photo Film Co., Ltd., Kanagawa (JP)

(*) Notice: Under 35 U.S.C. 154(b), the term of this patent shall be extended for 0 days.

(21) Appl. No.: 09/438,264

(22) Filed: Nov. 10, 1999

(30) Foreign Application Priority Data

Dec. 1, 1998 (JP) .................................................. 10-341681

(51) Int. Cl.$^7$ ......................... G03C 1/765; G03C 1/795; G03C 11/06; C08K 3/34; B32B 5/16
(52) U.S. Cl. ......................... 430/496; 430/523; 430/533; 428/331; 428/480; 524/493
(58) Field of Search .................................... 430/533, 496, 430/523; 428/331, 480; 524/493

(56) References Cited

U.S. PATENT DOCUMENTS 5,368,997 * 11/1994 Kawamoto ............................ 430/533
5,580,707 * 12/1996 Kawamoto ............................ 430/533

* cited by examiner

Primary Examiner—Richard L. Schilling
(74) Attorney, Agent, or Firm—Sughrue, Mion, Zinn, Macpeak & Seas, PLLC

(57) ABSTRACT

An object of the present invention is to provide a biaxial oriented polyester film and a method of manufacturing the same, in which sufficient suitability for the longitudinal stretching and transparency can be achieved in a film while a high slidability is ensured. Further, the present invention provides a photographic substrate and a photographic light-sensitive material utilizing the biaxial oriented polyester film having the above-described excellent characteristics. Specifically, a biaxial oriented polyester film and a method of manufacturing the same, a photographic substrate, and a photographic light-sensitive material are provided, and the biaxial oriented polyester film comprises 0.001 to 0.05% by weight of spherical silica particles with a number average particle diameter (Xm) of 0.20 to 0.50 μm and a particle size distribution represented by the following formula (1):

$$0.1 \leq |d_{90}-Xm|/|d_{10}-Xm| \leq 0.7 \quad (1)$$

wherein $d_{10}$ represents a particle diameter (μm) obtained when the number of the particles is summed from the particles with the smallest diameter toward the particles with larger diameters and the number reaches 10% of the total number of the particles, and $d_{90}$ represents a particle diameter obtained in the same manner as for $d_{10}$ described above except that the particle diameter is obtained when the number of the particles reaches 90% of the total number of the particles.

14 Claims, 1 Drawing Sheet

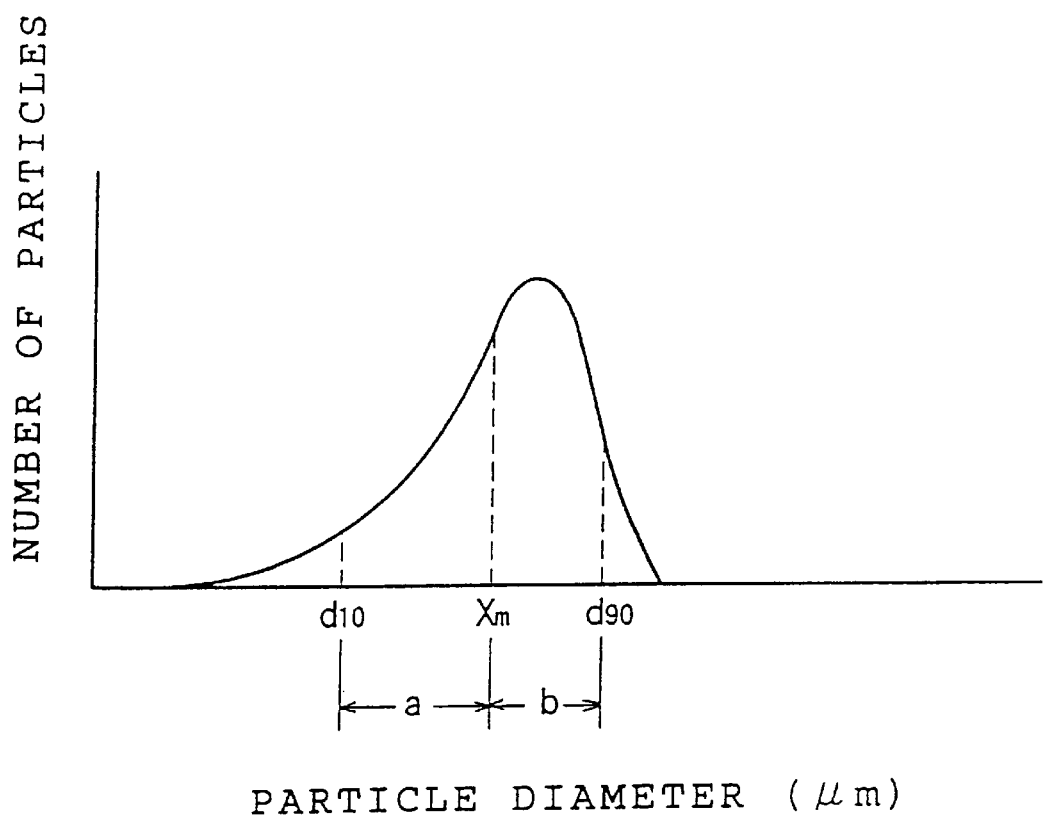

BIAXIAL ORIENTED POLYESTER FILM AND METHOD OF MANUFACTURING SAME, PHOTOGRAPHIC SUBSTRATE, AND PHOTOGRAPHIC LIGHT-SENSITIVE MATERIAL

BACKGROUND OF THE INVENTION

1. Field of the Invention

The present invention relates to a biaxial oriented polyester film and a method of manufacturing the same, and to a photographic substrate and a photographic light-sensitive material using the biaxial oriented polyester film. The biaxial oriented polyester film is suitable for use in various applications, in particular as a photographic substrate.

2. Description of the Related Art

Polyester films have excellent physical and chemical characteristics and have been used in various fields. Among these polyester films, a biaxial oriented polyester film, which has been stretched longitudinally and transversely so as to have high strength, is excellent in electric characteristics, chemical resistance, mechanical characteristics, flatness, dimensional stability, and economic efficiency, and therefore has been used in a large number of fields such as photography, magnetic recording media, and packaging.

The biaxial oriented polyester film has a drawback in that the film is not as good in slidability as in flatness, and this drawback adversely affects handling of the film in the manufacturing and working processes. Moreover, when the biaxial oriented polyester film is used as a substrate for a magnetic recording medium such as a photographic film (i.e., a photographic light-sensitive material) or a magnetic tape, excellent slidability is required so as to ensure travelling stability of the film in a camera, a developing device, a magnetic recording/replaying device, or the like.

In order to respond to such a demand for improvement in slidability, there are proposed a method of adding inorganic fine particles such as silica or calcium carbonate to the biaxial oriented polyester film, and a method of depositing fine particles containing calcium, lithium or phosphorus in the polymeric system at the time of synthesis of the polyester. With these methods, when the biaxial oriented polyester film is formed, projections are formed on the surface of the film by fine particles, and slidability is thereby obtained. However, since various apparatuses have been miniaturized and made precise recently, further improvement in slidability is desired.

Increasing the particle diameter of the fine particles to be added and the amount of the fine particles used is effective for improving slidability. However, scratches may be formed on the surface of the film by a roll during stretching of the film in the longitudinal direction thereof. Therefore, considering the suitability thereof for the longitudinal stretching of the film, the use of fine particles having a small particle diameter is desired, and the use of an excess of fine particles must be avoided. Further, a high degree of transparency is required in a substrate for a photographic film (a photographic substrate). However, a problem arises in that the transparency of the film decreases when fine particles having a large particle diameter are used or a large amount of fine particles are used.

Namely, in the biaxial oriented polyester film, an improvement in slidability is traded off against an improvement in suitability for the longitudinal stretching of the film and in transparency. Therefore, a biaxial oriented polyester film satisfying all of these characteristics and a manufacturing method thereof have been desired.

Accordingly, an object of the present invention is to provide a biaxial oriented polyester film and a method of manufacturing the same, in which a sufficient suitability for the longitudinal stretching and a sufficient transparency are achieved while a high degree of slidability is ensured. Further, another object of the present invention is to provide a photographic substrate and a photographic light-sensitive material utilizing the biaxial oriented polyester film having the above-described excellent characteristics.

SUMMARY OF THE INVENTION

The above-described objects are achieved by the present invention described below.

<1> A biaxial oriented polyester film, comprising 0.001 to 0.05% by weight of spherical silica particles with a number average particle diameter (Xm) of 0.20 to 0.50 μm and a particle size distribution represented by the following formula (1):

$$0.1 \leq |d_{90} - Xm| / |d_{10} - Xm| \leq 0.7 \tag{1}$$

wherein $d_{10}$ represents a particle diameter (μm) obtained when the number of the particles is summed from the particles with the smallest diameter toward the particles with larger diameters and the number reaches 10% of the total number of the particles, $d_{90}$ represents a particle diameter obtained in the same manner as for $d_{10}$ described above except that the particle diameter is obtained when the number of the particles reaches 90% of the total number of the particles, and Xm represents a number average particle diameter.

<2> A biaxial oriented polyester film according to <1>, wherein the average spherical ratio of the spherical silica particles is 1.0 to 1.2.

<3> A method of manufacturing a biaxial oriented polyester film of <1> or <2>, comprising: a low-molecular weight polymer forming step, in which low-molecular weight polymers of polyester containing the spherical silica particles are obtained by transesterification; a polymer forming step, in which polyester polymers are obtained by a polycondensation reaction of the low-molecular weight polymers of polyester; and an extruding and stretching step, in which the polyester polymers are melt extruded and biaxially stretched.

<4> A method of manufacturing a biaxial oriented polyester film according to <3>, wherein, in the low-molecular weight polymer forming step, the spherical silica particles are added to a reaction system before the transesterification substantially starts.

<5> A method of manufacturing a biaxial oriented polyester film according to <3>, wherein a filtration step, in which the low-molecular weight polymers of polyester are filtered with a filter, is carried out between the low-molecular weight polymer forming step and the polymer forming step.

<6> A method of manufacturing a biaxial oriented polyester film according to <5>, wherein the cutout rate of the filter with respect to standard particles with a particle diameter of 1 μm is 80% or more.

<7> A method of manufacturing a biaxial oriented polyester film according to <3>, wherein 5 to 40% by weight of the biaxial oriented polyester film of <1>, which has a limiting viscosity of 0.35 or more and has been shredded, is mixed with a lower alkyl ester of aromatic dicarboxylic acid, and the resulting mixture is, together with glycol, subjected to the transesterification carried out in the low-molecular weight polymer forming step.

<8> A photographic substrate formed from the biaxial oriented polyester film of <1>.
<9> A photographic substrate formed from a biaxial oriented polyester film which is manufactured with the method of manufacturing a biaxial oriented polyester film of <3>.
<10> A photographic light-sensitive material which has at least a light-sensitive layer formed on a substrate, wherein the substrate is the photographic substrate of <8>.

Since the biaxial oriented polyester film of the present invention described above uses the spherical silica particles having an appropriate number average particle diameter and an appropriate particle size distribution, sufficient suitability for the longitudinal stretching and transparency can be achieved while a high slidability is ensured. Specifically, the present invention provides a biaxial oriented polyester film with the above-described excellent characteristics by accommodating in the film spherical silica particles having a sufficient particle diameter to ensure a high slidability while preventing as much as possible the presence of spherical silica particles having a larger particle diameter which adversely affects the suitability thereof for longitudinal stretching and transparency, and by accommodating in the film a larger amount of spherical silica particles having a small particle diameter able to achieve sufficient suitability for longitudinal stretching and transparency.

BRIEF DESCRIPTION OF THE DRAWINGS

FIG. 1 is a curve of a particle diameter summation number, showing an example of the particle size distribution of the spherical silica particles used in the present invention.

DESCRIPTION OF THE PREFERRED EMBODIMENTS

The biaxial oriented polyester film of the present invention is obtained by accommodating spherical silica particles having a specific particle diameter and particle size distribution in polyester (a film), and then subjecting the polyester to biaxial stretching. In the following, the polyester and spherical silica particles forming the present invention will be described, and thereafter, a method of manufacturing the biaxial oriented polyester film and applications of the biaxial oriented polyester film in accordance with the present invention will be described.

1. Polyester

Polyester in the present invention refers to polyester obtained by polycondensation of aromatic dicarboxylic acid such as terephthalic acid, isophthalic acid, and naphthalene-2,6-dicarboxylic acid, or ester thereof, and dihydric alcohol such as ethylene glycol, diethylene glycol, tetramethylene glycol, and neopentyl glycol. In the present invention, the polycondensation of aromatic dicarboxylic acid and dihydric alcohol is preferably carried out after transesterification thereof so that low-molecular weight polymers of polyester, which contain spherical silica particles described later, are filtered with a high degree of precision.

Preferable examples of the polyester used in the present invention include polyethylene terephthalate (PET), polyethylene naphthalate (PEN), or copolymers thereof. It is preferable that 60 to less than 100 mol % of the repeating units of the copolymer forms ethylene naphthalate and the remainder forms ethylene terephthalate, in view of the heat stability, dimensional stability, and appropriate rigidity of the biaxial oriented polyester film obtained, and of the anticurl characteristics thereof when in the form of a roll film. For example, PEN is synthesized by reacting (polymerizing) a derivative of naphthalene-2,6-dicarboxylic acid (a derivative capable of forming ester such as anhydride or lower alkyl ester), ethylene glycol or a derivative thereof (a derivative capable of forming ester such as alkylene oxide), and other dihydric alcohols if desired, in the presence of a solvent under appropriate reaction conditions. Moreover, PET is synthesized, for example, by reacting (polymerizing) a derivative of terephthalic acid, ethylene glycol or a derivative thereof (a derivative capable of forming ester such as alkylene oxide), and other dihydric alcohols if desired, in the presence of a catalyst under appropriate reaction conditions. Further, the copolymer described above is synthesized by reacting (polymerizing) a derivative of naphthalene-2,6-dicarboxylic acid (a derivative capable of forming ester such as anhydride or lower alkyl ester), a derivative of terephthalic acid, ethylene glycol or a derivative thereof (a derivative capable of forming ester such as alkylene oxide), and other dihydric alcohols if desired, in the presence of a catalyst under appropriate reaction conditions. Furthermore, a copolymer obtained by adding terephthalic acid or a derivative thereof before completion of polymerization of polyethylene-2,6-naphthalate is also available.

Examples of dihydric alcohols which can be used other than ethylene glycol in the present invention include propylene glycol, trimethylene glycol, diethylene glycol, tetramethylene glycol, hexamethylene glycol, neopentyl glycol, p-xylene glycol, 1,4-cyclohexanedimethanol, bisphenol A, p,p'-dihydroxyphenylsulfone, 1,4-bis(β-hydroxyethoxyphenyl)propane, polyalkylene (e.g., ethylene or propylene) glycol, and p-phenylenebis (dimethylolcyclohexane). These dihydric alcohols may be used in an amount of 10 mol % or less.

The polyester described above can be formed in such a manner that a terminal hydroxyl group and/or carboxyl group is/are closed by a monofunctional compound such as, for example, benzoic acid, benzoyl benzoic acid, benzyloxy benzoic acid, and methoxypolyalkylene glycol. Alternatively, the polyester can be modified by, for example, an extremely small amount of glycerine, and a trifunctional or quadrifunctional ester-forming compound such as pentaerythritol, to an extent that a linear copolymer is substantially obtained.

When the above polyester is manufactured, a well-known catalyst can be used for the transesterification and the polycondensation. Further, well-known heat stabilizers, antioxidants, antistatic agents, slide agents, ultraviolet absorbing agents, pigments, dyes, and sunproofing agents may be added to the polyester. Fillers other than spherical silica particles may be added to the polyester as long as they do not interfere with the object of the present invention. Moreover, as catalysts for the polycondensation reaction, antimony trioxide, antimony pentoxide, antimony trifluoride, antimony sulfide, antimony tributylate, antimony ethylene glycolate, potassium antimonate, antimony acetate, antimony trichloride, germanium dioxide, germanium trioxide, manganese acetate, zinc acetate, lead acetate, alkali metal salts of benzoic acid, titanium alkoxide (e.g., titanium butoxide), and alkali metal salts of titanic acid are generally used. These catalysts may be used alone or in combinations.

Phosphoric acid, phosphorous acid or ester compounds thereof can be added as heat stabilizers. Examples of the heat stabilizers include trimethyl phosphate, triethyl phosphate, triphenyl phosphate, triphenyl phosphite, trimethyl phosphite, triethyl phosphite, and monoesters or diesters of triphenyl phosphite and phosphoric acid or phosphorous acid. In addition, well-known hindered phenols can be added as the antioxidant. For example, the antioxidants which are commercially available under the trade names of Irganox 1010, Sumilizer BHT, and Sumilizer GA-80 can be used. Further, secondary antioxidants can also be combined with these primary antioxidants. For instance, the secondary antioxidants which are commercially available under trade names of Sumilizer TPL-R, Sumilizer TPM, and Sumilizer TP-D can be used.

The method of manufacturing a biaxial oriented polyester film in accordance with the present invention will be described later in detail.

2. Spherical silica particles

Spherical silica particles obtained by any manufacturing method thereof can be used in the present invention. Examples of spherical silica particles include: (1) spherical silica particles obtained by spray drying sol, gel, or a suspension of an inorganic oxide or a hydroxide; (2) spherical silica particles obtained by hydrolysis and condensation reactions using an amine catalyst with a tetraalkoxysilane compound being used as a starting material; (3) spherical silica particles obtained by melting and spheroidizing a ground product of natural silica; (4) spherical silica particles obtained by granulating and spheroidizing, and thereafter calcining a precipitate obtained by neutralizing alkali salts of silicate with an acid; and (5) spherical silica particles obtained by ion exchange with an aqueous solution of sodium silicate being used as a raw material. Among these spherical silica particles, those obtained by the process of spray drying sol, gel, or a suspension of an inorganic oxide or a hydroxide, as described in (1), and the process of carrying out hydrolysis and condensation reactions using an amine catalyst with a tetraalkoxysilane compound being used as a starting material, as described in (2), are particularly preferable, as these processes facilitate control of the average particle diameter and the particle size distribution of the spherical silica particles.

Alkoxysilane compounds are the compounds represented by $(C_nH_{n+1}O)_4Si (n=1$ to $8)$. Specifically, tetramethoxysilane, tetraethoxysilane, tetrapropoxysilane, tetrabutoxysilane, and the like are preferably used as the compounds. As the catalyst for hydrolysis and polycondensation reactions, ammonia, trimethylamine, an aqueous solution of tetraethylammonia, urea, or the like can be used. Particularly preferable for use as the catalyst is an aqueous solution of ammonia.

The number average particle diameter (Xm) of the spherical silica particles used in the present invention is in the range of 0.20 to 0.50 $\mu$m, and preferably in the range of 0.22 to 0.48 $\mu$m. When the number average particle diameter is less than 0.20 $\mu$m, sufficient slidability cannot be imparted to the surface of the biaxial oriented polyester film. When the number average particle diameter exceeds 0.50 $\mu$m, deterioration in transparency takes place.

The spherical silica particles used in the present invention have the particle size distribution represented by the following formula (1):

$$0.1 \leq |d_{90} - Xm|/|d_{10} - Xm| \leq 0.7 \quad (1)$$

wherein $d_{10}$ represents a particle diameter ($\mu$m) obtained when the number of the particles is summed from the particles with the smallest diameter toward the particles with larger diameters and the number reaches 10% of the total number of the particles, $d_{90}$ represents a particle diameter obtained in the same manner as for $d_{10}$ described above except that the particle diameter is obtained when the number of the particles reaches 90% of the total number of the particles, and Xm represents a number average particle diameter.

In above formula (1), the denominator represents a difference between the particle diameter ($\mu$m) obtained when the number of the particles is summed from the particles with the smallest diameter toward the particles with larger diameters and the number reaches 10% of the total number of the particles (hereinafter referred to as "the particle size summation number"), and the number average particle diameter. The numerator represents a difference between the particle diameter ($\mu$m) obtained when the number of the particles is summed from the particles with the largest diameter toward the particles with smaller diameters and the number reaches 10% of the particle size summation number, and the number average particle diameter. Formula (1) indicates that the denominator is sufficiently smaller than the numerator. In other words, the particle size distribution seen from the side of the particles with large diameters is monodisperse, while the particle size distribution seen from the side of the particles with small diameters shows that particles with a wide range of particle diameters are present.

A graph (a curve of the particle diameter summation number), which shows an example of the particle size distribution of the spherical silica particles used in the present invention, is shown in FIG. 1. In the graph shown in FIG. 1, the abscissa axis indicates the particle diameter of the spherical silica particles, while the ordinate axis indicates the number of the spherical silica particles present with a specific particle diameter. The denominator and the numerator in formula (1) above correspond to a and b in the graph, respectively. Accordingly, as shown in FIG. 1, the graph having a steep shape towards the particles with large diameters and having a flared shape towards the particles with small diameters, is formed as the particle size distribution of the spherical silica particles used in the present invention.

With the particle size distribution of the spherical silica particles described above, the spherical silica particles, which can impart sufficient slidability to the surface of the biaxial oriented polyester film, are ensured towards the side of the particles with large diameters, while spherical silica particles with larger diameters which result in deterioration in transparency are excluded. Moreover, the spherical silica particles, which are needed in order to obtain sufficient suitability for the longitudinal stretching, are ensured towards the side of the particles with small diameters. The presence of particles with larger diameters leads to deterioration in suitability for filtration in the filtration step of the method of manufacturing the biaxial oriented polyester film, which will be described later. Namely, when the number of spherical silica particles with larger diameters is increased, it becomes difficult to carry out filtration of the low-molecular weight polymers of the polyester containing the spherical silica particles, and the time required for the filtration therefore becomes longer. As a result, the presence of these spherical silica particles is not preferable from the standpoint of manufacturing efficiency. Additionally, it becomes difficult to appropriately select a filter with appropriate filtering characteristics and therefore to conduct the filtration effectively.

The lower limit of formula (1) above is 0.1 or more, preferably 0.25 or more, and more preferably 0.35 or more. When the lower limit is less than 0.1, further improvement in suitability for the longitudinal stretching is not realized, and the effect of improvement in slidability is also small. On the other hand, the upper limit of above formula (1) is 0.7 or less, preferably 0.65 or less, and more preferably 0.60 or less. When the upper limit exceeds 0.7, scratches, which are formed by contact with the roll at the time of the longitudinal stretching, are apt to be made.

As described above, suppression of the presence of the particles with excessively large diameters is required for the spherical silica particles used. This suppression is achieved in the present invention by the particle size distribution represented by formula (1) above. More specifically, the content of the spherical silica particles with a particle diameter of 1 μm or more is preferably 1% or less, and more preferably 0.1% or less.

In the present invention, specific values for the number average particle diameter and the particle size distribution of the spherical silica particles were determined as follows: the spherical silica particles were photographed using an electron microscope (30,000× magnification); the particle diameters (an average value of the longer diameter and the shorter diameter) of 1,000 particles were measured, and the arithmetic average of the particles was determined; the curve of the particle size summation number was made using the average, and the particle diameters, obtained when the number of particles is summed from the particles with the smaller diameters and the number reaches 10%, 50%, and 90% of the particle size summation number, were indicated as $d_{10}$, Xm, and $d_{90}$, respectively.

As described above, the spherical silica particles, which satisfy the number average particle diameter and the particle size distribution defined in the present invention, can be easily obtained by classifying by use of a suitable classification means or sieving spherical silica particles produced by general production methods or commercially available spherical silica particles. Moreover, it is preferable that various types of spherical silica particles with a small particle size distribution, i.e., so-called monodisperse spherical silica particles, are mixed so as to satisfy the number average particle diameter and the particle size distribution defined in the present invention.

The biaxial oriented polyester film in accordance with the present invention contains 0.001 to 0.05% by weight of the spherical silica particles. When the content of the spherical silica particles is less than 0.001% by weight, sufficient slidability cannot be imparted to the surface of the biaxial oriented polyester film. Conversely, the content of more than 0.05% by weight of the spherical silica particles results in a deterioration in suitability for longitudinal stretching and transparency. The content of the spherical silica particles is preferably 0.002 to 0.03% by weight, and more preferably 0.002 to 0.01% by weight.

The word "spherical" in the spherical silica particles in the present invention refers to a shape of a substantial sphere. The average spherical ratio is preferably 1.0 to 1.2, and more preferably 1.0 to 1.15. By adding silica particles which are spherical, it becomes easy to form effective projections on the surface of the biaxial oriented polyester film obtained. Therefore, sufficient slidability can be ensured by using a small amount of the spherical silica particles, and as a result, excellent transparency can be ensured. When the silica particles have flat or irregular configurations, the projections on the surface of the biaxial oriented polyester film are susceptible to be lost at the time the film is obtained, and irregularity of the configurations of the projections is increased. As a result, a problem arises in that white powders are formed due to the silica particles coming off, or irregularity in the surface properties occurs at some portions. Further, when crushed natural silica, or silica obtained by secondary aggregation and having an irregular shape is used in its existing state, control of the particle size distribution is difficult, and therefore, it is difficult to satisfy the specific particle size distribution defined in the present invention.

The spherical ratio of the spherical silica particles in the present invention is a ratio of the longer diameter (L) to the shorter diameter (S) of the respective spherical silica particles, which have been photographed and projected by an electron microscope. The closer to 1 the ratio is, the more spherical the particles are. Further, the average spherical ratio of the spherical silica particles refers to the arithmetic average of the spherical ratio. In fact, however, the spherical silica particles were photographed with the electron microscope (30,000×), the longer diameters (L) and the shorter diameters (S) of the respective 1,000 particles were measured, and the average spherical ratio was determined by the following formula (2):

$$\text{Average spherical ratio} = \Sigma(Li/Si)/N \qquad (2)$$

(N: the number of the particles measured; i=1–N)

In the present invention, it is preferable that the spherical silica particles substantially have no pores, since too many pores on the surfaces of the spherical silica particles lead to an increase in aggregation. Specifically, the volume of the pores is preferably 0.05 ml/g or less.

3. Method of manufacturing biaxial oriented polyester film

The method of manufacturing a biaxial oriented polyester film in accordance with the present invention comprises: a low-molecular weight polymer forming step, in which low-molecular weight polymers of polyester containing the spherical silica particles are obtained by transesterification; a polymer forming step, in which polyester polymers are obtained by a polycondensation reaction of the low-molecular weight polymers of polyester; and an extruding and stretching step, in which the polyester polymers are melt extruded and biaxially stretched. A filtration step, in which the low-molecular weight polymers are filtered with a filter, is optionally carried out between the low-molecular weight polymer forming step and the polymer forming step. The respective steps will be described in the following. Low-molecular weight polymer forming step The low-molecular weight polymer forming step is a step of obtaining low-molecular weight polymers of polyester containing spherical silica particles by transesterification of an aromatic dicarboxylic acid dialkylester and a dihydric alcohol (in a transesterification bath). The transesterification can be effected using a well-known technique. Specifically, the transesterification is conducted by reacting a polybasic acid with a polyhydric alcohol under an applied pressure of 1 to 2 kg/cm² or an atmospheric pressure at a temperature of 180 to 280° C. (preferably 230 to 270° C.) for 0.5 to 8 hours (preferably 2 to 4 hours), and subsequently distilling the alcohol.

The spherical silica particles can be added at any stage of the low-molecular weight polymer forming step. Alternatively, the spherical silica particles can be easily dispersed in the low-molecular weight polymers by using, as a dihydric alcohol for the transesterification, slurry of a dihydric alcohol containing the spherical silica particles. In either method, the spherical silica particles are preferably added to a reaction system before the transesterification substantially starts, since aggregation of the spherical silica particles can be prevented, and the spherical silica particles can be evenly dispersed in the biaxial oriented film finally obtained.

In order to remove the spherical silica particles with a particle diameter of more than 1 μm, it is preferable that the spherical silica particles are filtered with a filter in advance before being added to the reaction system. The filter used here preferably has a cutout rate of 80% or more, with respect to standard particles having a particle diameter of 1 μm and used in the filtration step, which will be described later.

Additives, which are soluble in glycol, i.e., the raw material of polyester, and are optionally added (polycondensation catalysts including antimony compounds such as antimony trioxide and antimony acetate, and germanium compounds such as germanium dioxide, transesterification catalysts such as quadrihydrate of manganese acetate, quadrihydrate of magnesium acetate, dihydrate of zinc acetate, or the like), are preferably dissolved in a dihydric alcohol, and more preferably filtered with a filter in advance before being added to the reaction system. In view of removal of coarse particles and foreign objects, the filter used here, again, preferably has a cutout rate of 80% or more with respect to the standard particles having a particle diameter of 1 $\mu$m and used in the filtration step, which will be described later.

In the method of manufacturing a biaxial oriented polyester film in accordance with the present invention, since the spherical silica particles are added to the reaction system before the transesterification starts, and then the temperature is raised gradually, the spherical silica particles conform well with the glycol used as the raw material, and aggregation of the spherical silica particles, which is caused due to heat shock generated by addition of the spherical silica particles at high temperature during or after the transesterification, does not take place. Further, the spherical silica particles are further dispersed because the spherical silica particles undergo the filtration when they are low-molecular weight polymers with a low viscosity. As a result, there is little reaggregation of the spherical silica particles. On the other hand, contamination caused by contaminants from the outside can be effectively removed, and therefore, little deterioration in the quality of the polymers, such as hue deterioration, is caused. Accordingly, the method of manufacturing a biaxial oriented polyester film in accordance with the present invention is excellent from the point of view of recyclability.

When the biaxial oriented polyester film in accordance with the present invention is recycled, biaxial oriented polyester films which have been used and recovered are used in the above-mentioned low-molecular weight polymer forming step. Specifically, the biaxial oriented polyester films of the present invention with a limiting viscosity of 0.35 or more, which have been used, may be shredded when necessary so as to form flakes or the like, and thereafter, 5 to 40% by weight, and preferably 5 to 35% by weight of these biaxial oriented polyester films are mixed with a lower alkyl ester of an aromatic dicarboxylic acid, and the resulting mixture is subjected, together with a dihydric alcohol, to the transesterification in the low-molecular weight polymer forming step. By mixing the biaxial oriented polyester films which have been used, the amounts of new raw materials used can be reduced in accordance with the amount of the used polyester films. Therefore, saving of resources and cost can be easily attained.

When the biaxial oriented polyester film in accordance with the present invention, which has been used, has a limiting viscosity of less than 0.35, the density of a terminal carboxyl group of polyester forming the polyester film is high, the polycondensation reaction requires a long time, and the resulting polyester film is susceptible to coloring. Therefore, the used polyester film with a limiting viscosity of less than 0.35 is not preferable. It is more preferable that the limiting viscosity of the used polyester film is 0.45 or more.

Filtration step

The filtration step, in which the low-molecular weight polymers are filtered with a filter, is preferably carried out between the low-molecular weight polymer forming step described above and the polymer forming step, which will be described later. By carrying out the filtration step, spherical silica particles with large particle diameters, which are present among the spherical silica particles contained in the low-molecular weight polymers, can be removed, and deterioration in suitability for the longitudinal stretching and transparency of the film obtained can be prevented. Moreover, it is also possible to remove foreign objects such as contaminants or coarse particles contained in the low-molecular weight polymers so as to improve transparency and precision of the product.

The filter used in the filtration step has a cutout rate of preferably 80% or more, and more preferably 90% or more, with respect to the standard particles with a particle diameter of 1 $\mu$m.

The cutout rate with respect to the standard particles with a particle diameter of 1 $\mu$m is the rate (%) of particles which cannot go through a filter and remain on the filter when the particles with a single particle diameter of 1 $\mu$m are considered as the standard particles and a solution with these particles dispersed therein undergoes filtration. Filters generally have a structure of woven fabric, and openings are not completely uniform. Accordingly, in the present invention, the cutout rate is defined based not on the openings of the filter but on the standard particles with a particle diameter of 1 $\mu$m.

The reason for defining the particles with a particle diameter of 1 $\mu$m as the standard particles is that the particle diameter of 1 $\mu$m is the critical point which satisfies the following conditions: (1) in the present invention, it is necessary not to remove too many particles with large particle diameters since these particles contribute to an improvement in slidability; and (2) spherical silica particles with excessively large particle diameters, and foreign objects such as contaminants need to be removed effectively since these particles and foreign objects cause a deterioration in suitability for the longitudinal stretching and transparency of the film.

Specifically, in the present invention, the cutout rate with respect to the standard particles with a particle diameter of 1 $\mu$m was measured as follows: a suspension of standard particles with particle diameters of 0.5, 0.8, 1.0, 2.0, 3.0, and 5.0 $\mu$m (STANDEX and DYNOSPHERES, manufactured by Nippon Synthetic Rubber Co., Ltd.) in water was filtered under a pressure of 0.1 kg/cm$_2$; a curve of filtering performance of the filter was made from the results; and a cutout rate (%) with respect to the standard particles with a particle diameter of 1 $\mu$m was determined from the curve.

There is no problem in using a single filter having a cutout rate of 80% with respect to the standard particles with a particle diameter of 1 $\mu$m as long as the filter itself has the required characteristics. However, it is also preferable that a filter having a cutout rate of less than 80% is used, or a plurality of filters are used in an overlapping manner in order to improve the cutout rate. When a plurality of filters, each of which has a cutout rate of less than 80% with respect to the standard particles with a particle diameter of 1 $\mu$m, are overlapped with each other so that the cutout rate of the filters is made to be 80%, each of the filters preferably has a cutout rate of 50 to less than 80%, and 2 to 4 filters are preferably overlapped so as to have a cutout rate of 80% or more.

When carrying out the filtration step, all the additives to be added optionally in the polymer forming step (such as catalysts, stabilizers, antioxidants, anti-coloring agents, and fillers) are preferably added before the filtration step, in view of the removal of foreign objects and coarse particles.

Polymer forming step

Optionally after the filtration step, the low-molecular weight polymers obtained in the low-molecular weight polymer forming step undergo a polycondensation reaction in the polymer forming step, thereby forming polyester polymers. The polycondensation reaction can be effected using well-known techniques. For example, these techniques include a process for advancing a polycondensation reaction, in which: one or more types of compounds used as the catalysts for the polycondensation reaction, such as an antimony compound, a germanium compound, a titanium compound and the like, is/are heated to a temperature of about 230 to 320° C. (preferably 240 to 290° C.) under reduced pressure (preferably under a vacuum pressure of 50 to 1 mm Hg); the pressure is further reduced if desired (preferably to a high vacuum pressure of 1 mm Hg or less); and the compound(s) is/are heated for 1 to 3 hours so that ethylene glycol is distilled.

Stretching step

The polyester polymers formed in the polymer forming step are formed in a film shape, and thereafter subjected to stretching in the longitudinal and transverse directions of the film (biaxial oriented stretching) to complete the biaxial oriented polyester film in accordance with the present invention. As for the biaxial oriented stretching, the longitudinal stretching and the transverse stretching may be carried out sequentially or simultaneously. Further, after the biaxial oriented stretching has been carried out, the film can be stretched again in either the longitudinal direction or the transverse direction, or in both directions. Conditions for stretching are not particularly limited, and conditions employed in the prior art can be optionally selected. In general, a magnification of 2.0 to 5.0 is suitable.

4. Applications of the biaxial oriented polyester film in accordance with the present invention As described above, the biaxial oriented polyester film in accordance with the present invention is excellent in slidability, suitability for the longitudinal stretching, transparency, and recyclability. Moreover, as described above, the biaxial oriented polyester film obtained with the method of manufacturing a biaxial oriented polyester film in accordance with the present invention can prevent contamination of foreign objects and coarse particles and is excellent in transparency, and has few scratches on the surface of the film. As a result, the precision of the product itself is high. Accordingly, the biaxial oriented polyester film in accordance with the present invention (including the biaxial oriented polyester film obtained by the method of manufacturing a biaxial oriented polyester film in accordance with the present invention) is suitably used in fields in which any of the above-mentioned characteristics of the present invention is required.

Specifically, the applications include a photographic substrate, a substrate for a magnetic recording medium, wrapping material, a film for display, a film for a print substrate, and the like. The biaxial oriented polyester film in accordance with the present invention, which is particularly excellent in transparency, is most suitable for use as a photographic substrate (for example, a 135-size photographic film, a photographic film for the advanced photographic system (APS), a photographic film for an integral camera, or the like). Following is a description of a photographic light-sensitive material in a case in which the biaxial oriented polyester film in accordance with the present invention is used as a photographic substrate.

The photographic light-sensitive material has at least a light-sensitive layer formed on a substrate. When the biaxial oriented polyester film in accordance with the present invention is used as the substrate, slidability, which is required for travelling stability of the film in a camera, a developing device, and the like, can be ensured. In addition, a photographic light-sensitive material, which has few scratches on the surface thereof because of excellent suitability for the longitudinal stretching, and has high mechanical strength and excellent transparency, can be obtained. Further, since the biaxial oriented polyester film in accordance with the present invention is also excellent in recyclability, the amount of new raw materials used can be reduced by recycling the photographic light-sensitive materials which are no longer needed after development. Therefore, saving of resources and cost can be easily attained.

When the biaxial oriented polyester film in accordance with the present invention is used as a photographic light-sensitive material, the thickness of the film is preferably 30 to 150 $\mu$m, and more preferably 60 to 120 $\mu$m.

After the biaxial oriented polyester film in accordance with the present invention is subjected to the biaxial oriented stretching, and before an emulsion for forming a light-sensitive layer is applied to the biaxial oriented polyester film, a heat treatment may be conducted on the biaxial oriented polyester film at a temperature in a range of between 50° C. and the glass-transition temperature. The time required for conducting the heat treatment is generally 0.1 to 1,500 hours. The higher the heat treatment temperature is, the faster the treatment proceeds. However, when the heat treatment temperature is higher than the glass-transition temperature, molecules in the film move randomly, and therefore, the free volume of the film increases. As a result, a film whose molecules are apt to flow, i.e., a film susceptible to curling, is formed. Accordingly, the heat treatment needs to be conducted at a temperature equal to or lower than the glass-transition temperature.

When a photographic light-sensitive material is manufactured using the biaxial oriented polyester film in accordance with the present invention, since the surface of the polyester film is hydrophobic, it is very difficult to firmly adhere a light-sensitive layer of protective colloids, which is mainly comprised of gelatin, to the substrate (in the present invention, "the light-sensitive layers" comprise a light-sensitive layer of silver halide emulsion, and other layers which are not light-sensitive but form a photographic light-sensitive material, such as an undercoat layer, an intermediate layer, a filtering layer, and the like). Prior art which has attempted to overcome this drawback includes the following two processes: (1) a process in which a photographic emulsion is directly applied to a substrate after a surface activating treatment is conducted on the substrate, such as a chemical treatment, a mechanical treatment, a corona discharge treatment, a flame treatment, an ultraviolet irradiation treatment, a high frequency treatment, a glow discharge treatment, an active plasma treatment, a laser treatment, a mixed acid treatment, or an ozone oxidation treatment, or a process in which an undercoat layer is provided on a substrate after adhesive strength is obtained, and thereafter, a photographic emulsion layer is provided on the undercoat layer; and (2) a process in which an undercoat layer is provided on a substrate without these surface activating treatments being conducted, and a photographic emulsion layer is applied to the undercoat layer.

Adhesion can be ensured by the surface activating treatments described in the process (1). The reason is considered to be that some polar groups are formed on the surface of the substrate which is originally hydrophobic, thereby increasing the crosslinking density of the surface of the substrate.

As a result, it is considered that affinity between the polar groups and the components contained in an undercoat increases, or fastness of the surface of the substrate, to which the photographic emulsion layer is adhered, increases. Further, various processes for forming an undercoat layer are devised, and these processes include a so-called laminating process and a single-layer process. In the laminating process, a first layer which adheres well to a substrate (hereinafter simply referred to as a first undercoat layer) is provided, and a second layer of resin, which is hydrophilic and adheres well to a photographic emulsion layer (hereinafter simply referred to as a second undercoat layer), is applied onto the first undercoat layer. In the single-layer process, a single layer of resin containing both hydrophobic groups and hydrophilic groups is applied to a substrate.

In the undercoating process (2), various polymers can be used for the first undercoat layer formed in the laminating process. Examples of the polymers are copolymers whose starting materials are monomers selected from vinyl chloride, vinylidene choloride, butadiene, methacrylic acid, acrylic acid, itaconic acid, or maleic anhydride. Gelatin is mainly used for the second undercoat layer.

In the single-layer process, excellent adhesion is often achieved by swelling a substrate and effecting interfacial mixing with hydrophilic undercoating polymers. Examples of the hydrophilic undercoating polymers include water soluble polymers, cellulose esters, latex polymers, water soluble polyesters, and the like. Examples of the water soluble polymers include gelatin, derivatives of gelatin, casein, agar, alginic acid soda, starch, polyvinyl alcohol, copolymers of polyacrylate, copolymers of maleic anhydride, and the like. Examples of the cellulose esters include carboxymethyl cellulose, hydroxyethyl cellulose, and the like. Examples of the latex polymers include vinyl chloride containing copolymers, vinylidene containing chloride copolymers, acrylic ester containing copolymers, vinyl acetate containing copolymers, butadiene containing copolymers, and the like. Gelatin is most preferable among these hydrophilic undercoating polymers.

A backing layer is preferably provided on the photographic light-sensitive material at the side opposite the side to which the light-sensitive layer is applied. Binders for the backing layer may be hydrophobic polymers, or the hydrophilic polymers as used for the undercoat layer. Antistatic agents, lubricants, matting agents, surfactants, and dyes may be contained in the backing layer. The most preferable antistatic agent is at least one crystalline metallic oxide selected from $ZnO$, $TiO_2$, $SnO_2$, $Al_2O_3$, $In_2O_3$, $SiO_2$, $MgO$, $BaO$, $MoO_3$, and $V_2O_5$, or fine particles of composite oxides of these materials.

The light-sensitive layer (a silver halide emulsion layer) is described next. Although the silver halide emulsion layer may be formed for a black-and-white film or a color film, a silver halide color photographic light-sensitive material (a photographic light-sensitive material) will be described herein. At least one of blue-sensitive, green-sensitive, and red-sensitive silver halide emulsion layers can be provided on the substrate, and there is no specific limitation to the number and the order of the silver halide emulsion layers and non-light-sensitive layers. A typical example is a silver halide photographic light-sensitive material, comprising at least one light-sensitive layer comprised of a plurality of silver halide emulsion layers having substantially the same color sensitivity but different photographic sensitivities. The light-sensitive layers are unit light-sensitive layers which are sensitive to either blue light, green light, or red light. Generally, in a multilayer silver halide color photographic light-sensitive material, unit light-sensitive layers are arranged so that a red-sensitive layer is disposed on the substrate, a green-sensitive layer is disposed on the red-sensitive layer, and a blue-sensitive layer is disposed on the red-sensitive layer. However, the order of the unit light-sensitive layers may be reversed if desired or may be such that two light-sensitive layers having the same color sensitivity are disposed with a light-sensitive layer having a different color sensitivity interposed therebetween. A non-light-sensitive layer, which is normally used as an intermediate layer, may be provided between the silver halide light-sensitive layers described above, or as the uppermost or lowermost layer. The intermediate layer may contain couplers, DIR compounds, and the like. Further, the intermediate layer may contain an anti-color mixing agent, as is normally used therein.

Silver halide particles may be those having regular crystals such as cubes, octahedrons or crystals having 14 faces, those having irregular crystal configurations such as spherical or plate-like configurations, those having crystal defects such as twin planes, or composites of these silver halide particles. The silver halide particles may be fine particles with a particle diameter of about 0.2 $\mu$m or less, or large particles with a projected area diameter of up to about 10 $\mu$m, and may be a polydisperse or monodisperse emulsion. Flat particles with a spherical ratio of about 5 or more can also be used in the present invention. The crystal structure may be uniform, may have a halogen composition in which the interior and the exterior are heterogeneous, or may be laminar. Further, silver halides having different compositions may be junctioned to each other by epitaxial junction. Alternatively, silver halide may be junctioned to a compound other than silver halide, such as, for example, silver rhodanate or lead oxide. Moreover, a mixture of particles having various crystal configurations can be used. In general, a silver halide emulsion, which has been physically and chemically matured and undergone spectral sensitization, is used. The efficiency of the present invention is especially evident when an emulsion, which has been sensitized by a gold compound and a sulfur-containing compound, is used. Additives used in such a process are described in Research Disclosure Nos. 17643 and 18716.

Various color couplers can be used for the light-sensitive layer, and specific examples thereof are described in the above-mentioned Research Disclosure (RD) No. 17643, VII-C through G.

It is preferable that the light-sensitive material has a completely hydrophilic colloid layer on the side of the light-sensitive material on which the emulsion layer is formed, with a total coating thickness of 28 $\mu$m or less and a coating swelling rate $T_{1/2}$ of 30 seconds or less. The coating thickness refers to the coating thickness measured at an absolute humidity of 55% at 25° C. (2 days), and the coating swelling rate $T_{1/2}$ can be measured in accordance with well-known techniques in the art. For instance, the coating swelling rate $T_{1/2}$ can be measured using a swellometer (a swelling measuring instrument) of the type described by A. Green et al. in Photogr. Sci. Eng., Vol. 19, No. 2, pp. 124–129. $T_{1/2}$ is defined as the time required until the saturation coating thickness is achieved. The saturation coating thickness is 90% of the maximum swelling coating thickness which is achieved when the colloid layer is treated with a color developer at 30° C. for 3.25 minutes.

When the photographic light-sensitive material obtained is a 135-size photographic film, the diameter of a spool of a magazine for loading the film therein is generally 10 to 14 mm, and more usually 11 to 13 mm.

EXAMPLES

The present invention will be described more specifically with reference to the following examples. However, the present invention is not limited to the examples. "Parts" in the examples are based on weight unless otherwise specified.

[Example of preparing slurries of spherical silica particles]

Spherical silica particles having the characteristic values shown in the following Table 1 were respectively mixed with ethylene glycol while being stirred, and were subjected to ultrasonic irradiation for 120 minutes to prepare slurries, which respectively contain 10% by weight of the spherical silica particles A through D.

TABLE 1

Characteristics of Spherical Silica Particles

| type of spherical silica particles | A | B | C | D | E |
| --- | --- | --- | --- | --- | --- |
| number average particle diameter Xm ($\mu$m) | 0.28 | 0.47 | 0.28 | 0.15 | 0.28 |
| $d_{90}$ ($\mu$m) | 0.35 | 0.61 | 0.32 | 0.21 | 0.81 |
| $d_{10}$ ($\mu$m) | 0.16 | 0.15 | 0.25 | 0.02 | 0.10 |
| $|d_{90}-Xm|/|d_{10}-Xm|$ | 0.58 | 0.44 | 1.33 | 0.46 | 2.94 |
| spherical ratio | 1.10 | 1.15 | 1.05 | 1.05 | 1.10 |

Filtration suitability of the respective spherical silica particles was determined in the following process.

The spherical silica particles having the characteristic values shown in Table 1 above were respectively dispersed in ethylene glycol as described above to obtain slurries respectively containing 1% by weight of the spherical silica particles A through D. Fifty grams of the respective slurries were subjected to pressure filtration at 0.5 kg/cm$^2$ using filters A and B with an effective filtration area of 3.14 cm$^2$, and time required for the filtration was measured. This measurement was repeated 20 times using the same filters. "Good" is denoted when the rate of increase in the time required for the filtration is less than 10%, while "not good" is denoted when the rate is 10% or more.

The cutout rate (%) of the filters A and B, which were used for the evaluation of the filtration suitability, with respect to the standard particles with a particle diameter of 1 $\mu$m is shown in Table 2.

TABLE 2

Characteristics of Filters

| type of filter | A | B |
| --- | --- | --- |
| cutout rate with respect to standard particles with particle diameter of 1 $\mu$m | 95% | 10% |

Filtration of the spherical silica particles A through D was "good" with respect to both the filters A and B, whereas filtration of the spherical silica particles E, having a higher ratio of large diameter particles than particles A through D, was "not good" with respect to the filter A and "good" with respect to the filter B.

Example 1

<Manufacturing example A of a biaxial oriented polyester film>

1. Preparation of a solution of transesterification catalyst 0.02 parts of quadrihydrate of manganese acetate was dissolved in 0.4 parts of ethylene glycol at 70° C., and the resulting solution was cooled to room temperature. The cooled solution was filtered using a polypropyrene filter with openings of 1.0 $\mu$m (cutout rate with respect to the standard particles with a particle diameter of 1 $\mu$m: 95%) to prepare a solution of transesterification catalyst.

2. Preparation of a solution of polycondensation catalyst 0.035 parts of antimony trioxide was dissolved in 3.5 parts of ethylene glycol at 165° C., and the resulting solution was cooled to room temperature. The cooled solution was filtered using a polypropyrene filter with openings of 1.0 $\mu$m (cutout rate with respect to the standard particles with a particle diameter of 1 $\mu$m: 95%) to prepare a solution of polycondensation catalyst.

3. Preparation of a solution of stabilizer 0.03 parts of trimethylanic acid was mixed with 0.3 parts of ethylene glycol, and the resulting mixture was filtered using a polypropyrene filter with openings of 1.0 $\mu$m (cutout rate with respect to the standard particles with a particle diameter of 1 $\mu$m: 95%) to prepare a solution of stabilizer.

4. Synthesis of polyethylene-2,6-naphthalate

Low-molecular weight polymer forming step 100 parts of 2,6-naphthalene dicarboxylic acid dimethyl and 54 parts of ethylene glycol were introduced in a transesterification bath. The solution of transesterification catalyst and the solution of polycondensation catalyst which have been prepared in the above sections 1 and 2, respectively, and a slurry of the spherical silica particles A were added to the contents so that a desired amount (indicated in Table 3 below) of the content of the spherical silica particles A (in polyester) could be obtained. Subsequently, the contents were heated to 200° C. while being stirred. While methanol, which was generated (as a by-product) by the reaction, was continuously removed from a fractionating column, the temperature of the system was gradually raised to 20° C. to form low-molecular weight polymers of polyester.

Filtration step

After the completion of by-production of methanol was confirmed, the solution of stabilizer prepared in section 3 was added to the low-molecular weight polymers of polyester. Subsequently, the low-molecular weight polymers of polyester were transferred to a polycondensation bath while being filtered with the filter A in Table 2.

Polymer forming step

The pressure in the polycondensation bath was reduced from atmospheric pressure to 1 Torr in one hour. The contents were allowed to react for 2 hours while the temperature of the contents was kept at 285° C. to form polymers of polyethylene-2,6-naphthalate.

The limiting viscosity of the resulting polymers of polyethylene-2,6-naphthalate was 0.58 to 0.60 (mixed solvent in which phenol: 1,1,2,2-tetrachloroethane=3:2, measured at 25° C.).

5. Manufacture of a biaxial oriented polyester film

The polymers of polyethylene-2,6-naphthalate obtained in section 4 were dried at 160° C. for 10 hours under reduced pressure. The polymers were then melt extruded in a sheet configuration onto a rotating drum at 80° C. by an extruder set at 310° C., and an amorphous sheet having a thickness of 900 $\mu$m was thereby obtained. The sheet thus obtained was stretched at 125° C. to 3.0 times its original length in the longitudinal direction, and then was stretched at 145° C. to 3.3 times its original width in the transverse direction of the sheet. The sheet was subsequently set by heating at 250° C. for 2 seconds to obtain a virgin, biaxial oriented polyester film having a thickness of 90 $\mu$m.

<Manufacturing example B of a biaxial oriented polyester film—preparation of a recycled product>

1. Preparation of recovered polyester

An undercoat layer and an emulsion layer were provided on the virgin, biaxial oriented polyester film obtained in the above-described manufacturing example A to prepare a photographic film (a photographic light-sensitive material). These layers are the same as the layers described in the examples of Japanese Patent Application Laid-Open (hereinafter abbreviated to JP-A) No. 10-69027 (described in paragraph numbers 0052 through 0095 of JP-A 10-69027). The photographic film was set in a magazine for an APS film so as to form a photographic negative film, and the film was subjected to photographing and developing processing as in normal use. The used negative film thus obtained was shredded into flakes having a length of about 1 to 3 cm, immersed in 0.1 mol/liter of potassium hydroxide so as to remove a light-sensitive layer, and washed and dried to prepare recovered polyester. The limiting viscosity of the recovered polyester was 0.52.

2. Synthesis of polyethylene-2,6-naphthalate—2

Polymers of polyethylene-2,6-naphthalate were prepared in the same way as the synthesis of the polyethylene-2,6-naphthalate described in section 4 of the manufacturing example A, except that polyethylene-2,6-naphthalate in the form of flakes, which is the recovered polyester obtained in the above section 1, was introduced into the transesterification bath together with 2,6-naphthalene dicarboxylic acid dimethyl and ethylene glycol in the low-molecular weight polymer forming step.

However, in accordance with the rate of the recovered polyester flakes to the polymers of polyethylene-2,6-naphthalate obtained (recovery rate: 35%), the amounts of 2,6-naphthalene dicarboxylic acid dimethyl, ethylene glycol (except for ethylene glycol used in sections 1 through 3 of the manufacturing example A and used for preparation of the slurry of the spherical silica particles A), and the slurry of the spherical silica particles A used were respectively reduced.

3. Manufacture of a biaxial oriented polyester film

A biaxial oriented polyester film as a recycled product was obtained in the same way as the manufacture of the biaxial oriented polyester film described in section 5 of the manufacturing example A, using the polymers of polyethylene-2,6-naphthalate obtained in section 2.

<Evaluation tests>

The following evaluation tests were carried out on the virgin and recycled biaxial oriented polyester films. The results are shown in Table 3 below.

(1) Handling

Two thousand meters of the biaxial oriented polyester films having a width of 1,500 mm were respectively wound onto a core with a diameter of 30 cm, at a tensile force of 25 kg/m and a speed of 25 m/min. "○" indicates that winding wrinkles were formed, while "X" indicates that winding wrinkles were not formed.

(2) Scratches on the surfaces of the films

The biaxial oriented polyester films (1 m×2 m) were visually observed with a tungsten lamp, and the presence of scratches on the surfaces of the films was checked. "○" indicates that a scratch of 0.5 mm or more was not observed, while "X" indicates that a scratch of 0.5 mm or more was observed.

(3) Foreign objects

The biaxial oriented polyester films (3 cm×3 cm) were observed with a polarization microscope. "○" indicates that less than 10 foreign objects of 5 $\mu$m or more were observed, "Δ" indicates that 10 to 20 foreign objects of 5 $\mu$m or more were observed, and "X" indicates that more than 20 foreign objects of 5 $\mu$m or more were observed.

(4) Transparency

The biaxial oriented polyester films were respectively introduced into a cell filled with tricresyl phosphate and measured using a hazemeter (type Z-1001, manufactured by Nippon Denshoku Kogyo, Co., Ltd.). "○" indicates that less than 0.1% of haze was measured, while "X" indicates that more than 0.1% of haze was measured.

Example 2

Virgin and recycled biaxial oriented polyester films were manufactured, and evaluation tests were carried out in the same way as in Example 1, except that the spherical silica particles B in Table 1 were used in place of the spherical silica particles A and that the recovery rate of the recovered polyester was 20%. The results are collectively shown in Table 3 below.

Example 3

Virgin and recycled biaxial oriented polyester films were manufactured, and evaluation tests were carried out in the same way as in Example 1, except that the filter B in Table 2 was used in the filtration step in place of the filter A. The results are collectively shown in Table 3 below.

Comparative Example 1

Virgin and recycled biaxial oriented polyester films were manufactured, and evaluation tests were carried out in the same way as in Example 1, except that the spherical silica particles C in Table 1 were used in place of the spherical silica particles A. The results are collectively shown in Table 3 below.

Comparative Example 2

Virgin and recycled biaxial oriented polyester films were manufactured, and evaluation tests were carried out in the same way as in Example 1, except that the spherical silica particles D in Table 1 were used in place of the spherical silica particles A. The results are collectively shown in Table 3 below.

Comparative Example 3

Virgin and recycled biaxial oriented polyester films were manufactured, and evaluation tests were carried out in the same way as in Example 1, except that the spherical silica particles A were not added. The results are collectively shown in Table 3 below.

Comparative Example 4

Virgin and recycled biaxial oriented polyester films were manufactured in the same way as in Example 3, except that crushed silica particles, which will be described in the following, were used in place of the spherical silica particles A. Further, evaluation tests were carried out in the same way as in Example 1. The results are collectively shown in Table 3 below.

<Configuration and the like of the crushed silica particles>
number average particle diameter Xm=0.45 ($\mu$m)
$d_{10}$=0.65 ($\mu$m)
$d_{10}$=0.15 ($\mu$m)
$|d_{90}-Xm|/|d_{10}-Xm|$=0.67
spherical ratio=1.87

TABLE 3

Manufacturing Conditions and Characteristics of Films

|  |  | Example 1 | Example 2 | Example 3 | Comparative Example 1 | Comparative Example 2 | Comparative Example 3 | Comparative Example 4 |
|---|---|---|---|---|---|---|---|---|
| spherical silica particles | type | A | B | A | C | D | none | crushed |
|  | content (% by weight) | 0.005 | 0.002 | 0.005 | 0.005 | 0.005 | 0.005 | 0.005 |
| type of filter |  | A | A | B | A | A | A | B |
| recovery rate of recovered polyester (%) |  | 35 | 20 | 35 | 35 | 35 | 35 | 35 |
| results of evaluation tests | virgin (1) handling | ○ | ○ | ○ | ○ | x | x | ○ |
|  | (2) scratches on surface of film | ○ | ○ | ○ | x | ○ | x | ○ |
|  | (3) foreign objects | ○ | ○ | Δ | ○ | ○ | ○ | Δ |
|  | (4) transparency | ○ | ○ | ○ | ○ | ○ | ○ | x |
|  | recycled (1) handling | ○ | ○ | ○ | ○ | x | x | ○ |
|  | (2) scratches on surface of film | ○ | ○ | ○ | x | ○ | x | ○ |
|  | (3) foreign objects | ○ | ○ | Δ | ○ | ○ | ○ | Δ |
|  | (4) transparency | ○ | ○ | ○ | ○ | ○ | ○ | x |

As can be seen from the results of Table 3 above, in Examples 1 to 3 in which the spherical silica particles A and B having the number average particle diameter and the particle size distribution defined in the present invention were used, as well as the virgin films, even the recycled products exhibited excellent handling and transparency, and showed no scratches on the surfaces of the films. However, in Example 3, in which the filter used in the filtration step had low cutout rate (%) with respect to the standard particles with a particle diameter of 1 µm (i.e., the filter B), a few foreign objects were recognized.

On the other hand, in Comparative Example 1, in which the spherical silica particles with a wider distribution towards the particles with large diameters (C) were used, scratches were recognized on the surfaces of the films due to deterioration in suitability for the longitudinal stretching. In Comparative Example 2, in which the spherical silica particles with a small number average particle diameter (D) were used, handling of the films was impaired due to deterioration in slidability. Namely, the films creaked during winding, and winding wrinkles were formed. Further, in Comparative Example 3 in which no silica particles were used, handling was very bad, and many scratches were recognized on the surfaces of the films. Furthermore, in Comparative Example 4 in which non-spherical, crushed silica particles were used, transparency of even the virgin film was much worse in comparison with that of the films in the Examples.

As described above, in accordance with the present invention, a biaxial oriented polyester film, which can achieve sufficient suitability for the longitudinal stretching and transparency while a high level of slidability is ensured, and a method of manufacturing the same can be provided by containing in a film spherical silica particles with a specific number average particle diameter and particle size distribution.

Moreover, in accordance with the present invention, a biaxial oriented polyester film which has no aggregation of the spherical silica particles and is excellent in recyclability, and a method of manufacturing the same can be provided.

Further, the spherical silica particles with an average number particle diameter and a particle size distribution specified in the present invention are excellent in suitability for filtration. Accordingly, by using the spherical silica particles, effective and efficient filtration of low-molecular weight polymers can be conducted in synthesis of polyester, between the low-molecular weight polymer forming step and the polymer forming step. As a result, a method of manufacturing a biaxial oriented polyester film, in which no contamination of foreign objects or the like is generated, can be provided.

Furthermore, in accordance with the present invention, a photographic substrate and a photographic light-sensitive material using the biaxial oriented polyester film with the excellent characteristics described above can be provided.

What is claimed is:

1. A biaxial oriented polyester film, comprising 0.001 to 0.05% by weight of spherical silica particles with a number average particle diameter (Xm) of 0.20 to 0.50 µm and a particle size distribution represented by the following formula (1):

$$0.1 \leq |d_{90} - Xm|/|d_{10} - Xm| \leq 0.7 \tag{1}$$

wherein $d_{10}$ represents a particle diameter (µm) obtained when the number of the particles is summed from the particles with the smallest diameter toward the particles with larger diameters and the number reaches 10% of the total number of the particles, $d_{90}$ represents a particle diameter obtained in the same manner as for $d_{10}$ described above except that the particle diameter is obtained when the number of the particles reaches 90% of the total number of the particles, and Xm represents a number average particle diameter.

2. A biaxial oriented polyester film according to claim 1, wherein the average spherical ratio of the spherical silica particles is 1.0 to 1.2.

3. A method of manufacturing a biaxial oriented polyester film of claim 1, comprising:

a low-molecular weight polymer forming step, in which low-molecular weight polymers of polyester containing the spherical silica particles are obtained by transesterification;

a polymer forming step, in which polyester polymers are obtained by a polycondensation reaction of the low-molecular weight polymers of polyester; and an extruding and stretching step, in which the polyester polymers are melt extruded and biaxially stretched.

4. A method of manufacturing a biaxial oriented polyester film according to claim 3, wherein, in said low-molecular weight polymer forming step, the spherical silica particles are added to a reaction system before the transesterification substantially starts.

5. A method of manufacturing a biaxial oriented polyester film according to claim 3, wherein a filtration step, in which the low-molecular weight polymers of polyester are filtered with a filter, is carried out between said low-molecular weight polymer forming step and said polymer forming step.

6. A method of manufacturing a biaxial oriented polyester film according to claim 5, wherein the cutout rate of the filter with respect to standard particles with a particle diameter of 1 μm is 80% or more.

7. A method of manufacturing a biaxial oriented polyester film according to claim 3, wherein 5 to 40% by weight of the biaxial oriented polyester film of claim 1, which has a limiting viscosity of 0.35 or more and has been shredded, is mixed with a lower alkyl ester of aromatic dicarboxylic acid, and the resulting mixture is, together with glycol, subjected to the transesterification carried out in said low-molecular weight polymer forming step.

8. A photographic substrate formed from the biaxial oriented polyester film of claim 1.

9. A photographic substrate formed from a biaxial oriented polyester film which is manufactured with the method of manufacturing a biaxial oriented polyester film of claim 3.

10. A photographic light-sensitive material which has at least a light-sensitive layer formed on a substrate, wherein the substrate is the photographic substrate of claim 8.

11. A biaxial oriented polyester film according to claim 1, wherein the pore volume of the spherical silica particle is 0.05 ml/g or less.

12. A biaxial oriented polyester film according to claim 1, wherein the content of the spherical silica particles with a particle diameter of 1 μm or more is 1% or less.

13. A biaxial oriented polyester film according to claim 1, wherein the spherical silica particles are manufactured by dry spraying sol, gel, or a suspension of an inorganic oxide or a hydroxide.

14. A biaxial oriented polyester film according to claim 1, wherein the spherical silica particles are manufactured by hydrolysis and condensation reactions of a tetraalkoxysilane compound in the presence of a catalyst.

* * * * *